United States Patent [19]
DeVaudreuil et al.

[11] Patent Number: 6,114,025
[45] Date of Patent: Sep. 5, 2000

[54] FOAM AND FILM/FOAM LAMINATES USING LINEAR LOW DENSITY POLYETHYLENE

[75] Inventors: Michael D. DeVaudreuil, Hickory, N.C.; Jennifer M. Crowell, Saratoga Springs, N.Y.; Anthony R. Smith, Granite Falls, N.C.; Gary R. Wilkes, Okemos, Mich.

[73] Assignee: Tenneco Protective Packaging, Inc., Glens Falls, N.Y.

[21] Appl. No.: 09/094,884

[22] Filed: Jun. 15, 1998

[51] Int. Cl.$^7$ ............................... B32B 3/26; C08F 110/02
[52] U.S. Cl. ............................ 428/319.9; 264/55; 428/71; 428/316.6; 428/317.1; 428/318.6; 428/903.3; 521/143; 525/191
[58] Field of Search ................................. 521/142, 143; 428/316.6, 317.1, 318.6, 319.9, 71, 903.3; 264/55

[56] References Cited

U.S. PATENT DOCUMENTS

| | | |
|---|---|---|
| 3,644,230 | 2/1972 | Cronin . |
| 3,812,062 | 5/1974 | Tatzel et al. ......................... 521/143 X |
| 4,217,319 | 8/1980 | Komori ....................................... 264/53 |
| 4,289,857 | 9/1981 | Hoki et al. ................................ 521/85 |
| 4,331,779 | 5/1982 | Park ........................................... 521/134 |
| 4,343,913 | 8/1982 | Watanabe et al. ......................... 521/94 |
| 4,345,041 | 8/1982 | Hoki et al. ................................ 521/94 |
| 4,359,539 | 11/1982 | Hoki et al. ................................ 521/79 |
| 4,369,257 | 1/1983 | Hoki et al. ................................ 521/79 |
| 4,528,300 | 7/1985 | Park ........................................... 521/79 |
| 4,644,013 | 2/1987 | Fujie et al. ............................... 521/60 |
| 4,657,811 | 4/1987 | Boyd et al. ........................... 428/318.6 |
| 4,661,401 | 4/1987 | Akao ................................ 428/317.1 X |
| 4,663,361 | 5/1987 | Park ........................................... 521/94 |
| 4,694,025 | 9/1987 | Park ........................................... 521/88 |
| 4,694,026 | 9/1987 | Park ........................................... 521/94 |
| 4,714,716 | 12/1987 | Park ........................................... 521/80 |
| 4,738,810 | 4/1988 | Cheng-Shiang ........................... 264/54 |
| 4,868,025 | 9/1989 | Strzelewicz ............................. 428/35.2 |
| 4,948,817 | 8/1990 | Kuwabara et al. ........................ 521/58 |
| 5,000,992 | 3/1991 | Kelch ................................ 428/318.6 X |
| 5,030,662 | 7/1991 | Banerjie ................................. 521/43.5 |
| 5,053,435 | 10/1991 | Kuwabara et al. ........................ 521/60 |
| 5,059,376 | 10/1991 | Pontiff et al. ............................ 264/234 |
| 5,089,533 | 2/1992 | Park ........................................... 521/79 |
| 5,128,212 | 7/1992 | Kneale et al. .................... 428/903.3 X |
| 5,340,840 | 8/1994 | Park et al. ................................ 521/60 |
| 5,348,984 | 9/1994 | Lee ........................................... 521/79 |
| 5,369,136 | 11/1994 | Park et al. .............................. 521/143 |
| 5,387,620 | 2/1995 | Park et al. .............................. 521/143 |
| 5,462,974 | 10/1995 | Lee ........................................... 521/79 |
| 5,667,928 | 9/1997 | Thomas et al. ......................... 430/134 |
| 5,736,258 | 4/1998 | Moy ......................................... 428/523 |
| 5,876,813 | 3/1999 | Bambara et al. ..................... 428/71 X |

FOREIGN PATENT DOCUMENTS

| | | | |
|---|---|---|---|
| 42 01 763 A1 | 7/1992 | Germany ........................ C08L 23/02 |
| 9231337 | 9/1997 | Japan ............................. G06K 19/02 |
| WO 97/07907 | 3/1997 | WIPO ............................. B21D 9/00 |

OTHER PUBLICATIONS

Brochure entitled "The best all–around protection for your furniture," Tenneco Packaging—AVI, 10 pages, 1994.

*Primary Examiner*—Richard D. Lovering
*Attorney, Agent, or Firm*—Jenkens & Gilchrist

[57] ABSTRACT

A polymeric composition to be used in producing foam. The polymeric composition comprises a linear low density polyethylene and a resiliency modifier resin. The linear low density polyethylene is in the amount of from about 1 to about 90 weight percent of the polymeric composition. The linear low density polyethylene has a z-average molecular weight, $M_z$, greater than about 700,000. The resiliency modifier resin is in the amount of from 10 to about 99 weight percent of the polymeric composition. The resiliency modifier resin can be made of a low density polyethylene. Reclaimed material may comprise a portion of the linear low density polyethylene.

57 Claims, 5 Drawing Sheets

FOAM AND FILM/FOAM LAMINATES USING LINEAR LOW DENSITY POLYETHYLENE

FIELD OF THE INVENTION

The present invention is directed to a polymeric composition to be used in producing a foam. Specifically, the polymeric composition is comprised of linear low density polyethylene and a resiliency modifier resin such as low density polyethylene. The foam can be used in a film/foam laminate.

BACKGROUND OF THE INVENTION

There have been a variety of foams produced in the past. A first commonly produced foam is made from polystyrene and a second commonly produced foam is made from low density polyethylenes (LDPEs). The polystyrene foam is too brittle for some applications like protective packaging which require protection from multiple impacts. LDPE foams are generally considered to be resilient and non-brittle, which are desirable properties. It is desirable to improve the tear strength, tensile strength and overall toughness of the LDPE foams in certain applications including protective packaging of heavy, delicate, and valuable items, such as furniture.

LLDPE resins have desirable properties such as good tear strength, tensile strength and overall toughness. It is very difficult, however, to produce a LLDPE foam that is dimensionally stable. In fact, even a small amount of LLDPE added to, for example, a LDPE foam will produce a foam that is not dimensionally stable. Of course, it is very desirable to produce a foam that is dimensionally stable.

Film/foam laminates have been produced for many years. Film/foam laminates have comprised, for example, a polyethylenic film laminated to a low density polyethylenic (LDPE) foam. The film portion of the film/foam laminate has generally comprised a conventional Ziegler-Natta catalyzed LLDPE or a combination of the conventional Ziegler-Natta catalyzed LLDPE and a LDPE for applications such as protective packaging. These conventional LLDPEs are generally characterized by a polydispersity index, $D=M_w/M_n$, of from 4 to 8 and have a z-average molecular weight below about 600,000. The use of this conventional LLDPE in the film portion is desirable because it provides the film/foam laminate structure with tear strength, tensile strength and overall toughness that can not be attained by using LDPE alone. Additionally, LLDPEs are desirable because of their economical savings over LDPEs.

In contrast, the foam portion of the film/foam laminate has consisted essentially of LDPE. The foam portion has not included LLDPEs, other than in trace amounts, because of reasons such as the inability to produce a dimensionally stable foam.

Film/foam laminates that use a conventional LLDPE in the film portion have certain disadvantages. For example, the film/foam laminate that is not suitable for sale (i.e., scrap material) cannot effectively be re-used or recycled in economical quantities into either the film portion or the foam portion. This scrap material is not desired in the film portion because the scrap material contains a significant fraction of LDPE from the foam portion which significantly weakens the strength of the film/foam laminate. The scrap material cannot be incorporated into the foam portion because of the above-discussed problems associated with producing a dimensionally stable foam. If scrap material can be recovered, then this would significantly reduce or eliminate the costly disposal of the in-process scrap that is associated with the manufacture of film/foam laminates.

SUMMARY OF THE INVENTION

It is an object of the present invention to produce a foam that is capable of being re-used or recycled if the foam is not suitable for use (i.e., scrap material).

It is another object to produce a film/foam laminate that is capable of being re-used or recycled if the foam is not suitable for use (i.e., scrap material).

It is yet another object of the present invention to allow recovery of film/foam laminate scrap into a useful foam product.

It is further object of the invention to product a foam structure that is dimensionally stable.

In one embodiment, a polymeric composition is to be used in producing foam. The polymeric composition comprises a linear low density polyethylene and a resiliency modifier resin. The linear low density polyethylene is in the amount of from about 1 to about 90 weight percent of the polymeric composition. The linear low density polyethylene has a z-average molecular weight, $M_z$, greater than about 700,000. The resiliency modifier resin is in the amount of from 10 to about 99 weight percent of the polymeric composition.

In another embodiment, the polymeric composition to be used in producing the foam may be used in film/foam laminates.

BRIEF DESCRIPTION OF THE DRAWINGS

Other objects and advantages of the invention will become apparent upon reading the following detailed description and upon reference to the drawings.

While the invention is susceptible to various modifications and alternative forms, a specific embodiment thereof has been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

According to one embodiment of the present invention, foam is produced using from about 1 to about 90 weight percent of linear low density polyethylene (LLDPE), with the remainder (i.e., 10 to about 99 weight percent) being essentially a resiliency modifier resin such as low density polyethylene (LDPE). The foam is preferably produced using from about 10 to about 60 weight percent LLDPE and from about 40 to about 90 weight percent resiliency modifier resin and most preferably from about 20 to about 45 weight percent LLDPE and from about 55 to about 80 weight percent resiliency modifier resin. It is preferred to have LDPE as the resiliency modifier resin. The LLDPE of the present invention is characterized by a molecular weight distribution with a polydispersity index, $D=M_w/M_n$, in the range from about 10 to about 20 and a z-average molecular weight, $M_z$, greater than about 700,000.

The term "scrap" or "scrap material" is used herein as being foams or film/foam laminates that are not suitable for use due to a variety of reasons which include physical damage, missing structural layer and non-uniform color. The term "reclaimed material" is used herein as being scrap material that previously existed as foam or a film/foam laminate and has been reprocessed for incorporation (i.e., as compounded pellets) as a material into the invention.

The term "virgin resin" is used herein as being material directly from a material supplier that has not been extruded subsequent to initial processing by the material supplier.

The reclaimed material generally comprises from about 30 to about 80 weight percent of a LLDPE having a molecular weight distribution with a polydispersity index, $D=M_w/M_n$, in the range from about 10 to about 20 and a $M_z$ greater than about 700,000. The remainder of the reclaimed material is generally from about 20 to about 70 weight percent of a resiliency modifier resin such as LDPE.

The reclaimed material may be included in the polymeric composition to be used in producing the foam at levels up to about 50 weight percent and even up to 75 weight percent. Thus, the polymeric composition comprises LLDPE attributable from the reclaimed material from up to about 40 and even up to about 60 weight percent of the polymeric composition. The polymeric composition generally comprises LLDPE attributable from the reclaimed material from about 10 to about 35 weight percent of the polymeric composition. It is contemplated that additional virgin LLDPE resin may be added to the polymeric composition so that the polymeric composition comprises up to about 90 weight percent LLDPE.

The preferred polymeric composition to be used in producing the inventive foam comprises virgin LLDPE resin from about 25 to about 56 weight percent, virgin LDPE resin from about 15 to about 40 weight percent, and reclaimed material from about 20 to about 50 weight percent. The preferred weight ratio of LLDPE resin to LDPE resin is from about 1.2:1 to about 1.7:1. The most preferred polymeric composition comprises virgin LLDPE resin from about 33 to about 46 weight percent, virgin LDPE resin from about 21 to about 32 weight percent, and reclaimed material from about 30 to about 40 weight percent. The most preferred weight ratio of LLDPE to LDPE is from about 1.4:1 to about 1.6:1.

It is contemplated that more than one LLDPE and/or LDPE can comprise the respective LLDPE and LDPE of the polymeric composition. For example, two LLDPE resins (each 20 weight percent) can be blended to comprise 40 weight percent LLDPE of the polymeric composition.

LLDPEs

The linear low density polyethylene (LLDPEs) of the present invention is defined as copolymers of ethene and one or more $C_3$–$C_{12}$ alpha olefins having a specific gravity from about 910 to about 940 kg/m³, and a z-average molecular weight, $M_z$, greater than about 700,000. The $M_z$ is preferably greater than 800,000 and most preferably greater than about 900,000. The z-average molecular weight is characterized by a concentration of extremely high molecular weight polymer chains (i.e., those near an upper end of the molecular weight distribution).

The LLDPE of the present invention generally has a melt flow index (MI) of from about 0.5 to about 1.5 dg/min. as measured by ASTM D1238 Condition E (nominal flow rate at 190° C. and 298.2 kPa), a high load melt flow index (HLMI) of from about 70 to about 90 dg/min. as measured by ASTM D1238 Condition F (nominal flow rate at 190° C. and 2.9822 MPa), and a melt flow ratio (MFR=HLMI/MI) of from about 70 to about 120. The linear low density ethylene polymer generally has a MI less than about 10 dg/min., and preferably less than about 3 dg/min.

Preferred LLDPEs include uncrosslinked copolymers of ethene with 1-butene, 1-hexene, 1-octene and combinations thereof. The preferred LLDPE has a specific gravity of from about 918 to about 926 kg/m³, a MI of from about 0.6 to about 1.0 dg/min., a melt flow ratio (MFR) from about 100 to about 120, a weight average molecular weight, $M_w$, of from about 180,000 to about 200,000, a number average molecular weight, $M_n$, of from about 12,500 to about 16,000, and a polydispersity index, $D=M_w/M_n$, of from about 10 to about 20. The most preferred polydispersity index is from about 14 to about 18. The most preferred LLDPE is made in a low pressure gas phase process.

The LLDPE of the present invention can be obtained by blending two or more LLDPEs. For instance, a LLDPE having a $M_z$ of 600,000 may be blended with a second LLDPE having a $M_z$ of 1,200,000.

Resiliency Modifier Resin

Examples of a resiliency modifier resin of the present invention are chosen from LDPE, medium density polyethylene, ethylene vinyl acetate, ethylene ethyl acrylate, ethylene methyl acrylate, ethylene n-butyl acrylate, ethylene acrylic acid, ethylene methacrylic, ethylene vinyl alcohol and ionomer. The preferred resiliency modifier resin of the present invention is LDPE.

The term LDPE as used herein includes branched homopolymers of ethylene and copolymers comprised of at least 50 mole percent of a ethylene unit (preferably at least 70 mole percent) and a minor (i.e., less than 50%) proportion of a monomer copolymerizable with the ethylene unit. The term LDPE as used herein also includes physical blends of two or more different homopolymers that are classified as LDPEs or physical blends of at least 50 percent by weight of an ethylene homopolymer (preferably at least about 60 weight percent) with another predominately low density polyethylenic copolymer. The physical blends are combined in a dry form after the resins have previously been polymerized.

The preferred LDPEs are uncrosslinked and have a specific gravity of from about 915 to about 925 kg/m³, and a melt flow index (MFI) of from about 0.2 to about 3.8 dg/min. as measured by ASTM D1238 (nominal flow rate at 190° C. and 689.5 kPa). The low density ethylene polymer generally has a MFI of less than about 10 dg/min.

It is contemplated that the LDPE of the present invention can be obtained by blending two or more LDPE resins. Additionally, a LDPE resin may be blended with a second resiliency modifier resin such as ethylene vinyl acetate. Likewise, two or more resiliency modifier resins may be blended such as ethylene vinyl acetate and ethylene ethyl acrylate.

Nucleating Agent

The foam of the present invention may include a nucleating agent. A nucleating agent, or cell size control agent, can be any conventional or useful nucleating agent(s). The amount of nucleating agent to be added depends upon the desired cell size, the selected blowing agent and the density of the polymeric composition. The nucleating agent is generally added in amounts from about 0.02 to about 2.0 weight percent of the polymeric composition. Some contemplated nucleating agents include inorganic materials (in small particulate form), such as clay, talc, silica, and diatomaceous earth. Other contemplated nucleating agents include organic nucleating agents which decompose or react at the heating temperature within the extruder to evolve gas.

One example of an organic nucleating agent is a combination of an alkali metal salt of a polycarboxylic acid with a carbonate or bicarbonate. Some examples of an alkali metal salt of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate respectively), and the disodium salt of ethanedioic acid (commonly referred to as sodium oxalate) or polycarboxylic acid such as 2-hydroxy-1,2,3-propanetricarboxylic acid. Some examples of a carbonate or a bicarbonate include, but are not limited to, sodium carbonate, sodium bicarbonate, potassium bicarbonate, potassium carbonate, and calcium carbonate.

One contemplated combination is a monoalkali metal salt of a polycarboxylic acid, such as monosodium citrate or monosodium tartrate, with a carbonate or bicarbonate. It is contemplated that mixtures of different nucleating agents may be added in the present invention. Preferred nucleating agents include talc, crystalline silica, and a stoichiometric mixture of citric acid and sodium bicarbonate (the stoichiometric mixture having a 1 to 100 percent concentration where the carrier is a suitable polymer such as low molecular weight polyethylene wax). Talc is preferably added in a carrier, but may also be added in a powder form. The most preferred nucleating agent is talc at about 48 to about 52 percent loading in a LDPE carrier which is added to produce a talc concentration in the foam from about 0.5 to about 1.0 weight percent.

Stability Control Agent

The foam of the present invention includes stability control agents. Some examples of stability control agents include, but are not limited to, the partial ester of a long chain fatty acid and a polyol, such as glycerol monostearate; a mixture of $C_{12}$–$C_{18}$ fatty acid esters of glycerol; certain borate or phosphinate glycol ester compounds such as tri(1-stearyl-glycero)borate, tri(monostearylpolyoxyethyleneglycol)borate, di(1-stearylglycero)phosphinate; saturated higher fatty acid amides; such as stearamide; saturated higher aliphatic amines and complete esters of saturated higher fatty acids. N-higher aliphatic hydrocarbyl substituted amide of a $C_1$ to $C_8$ aliphatic carboxylic acid such as N-stearyl acetamide or N-stearyl caprylamide; certain higher aliphatic hydrocarbyl ether, ester or anhydride compounds such as behenic anhydride, distearyl ether, distearyl thioether, stearyl laurate and stearyl thiolaurate; certain naphthyl amine compounds such as N,N'-di-beta-naphthyl-paraphenylenediamine or N,N'-di-beta-naphthyl-paradiphenylenediamine, and glycerol monoester of a $C_{20}$–$C_{24}$ fatty acid. The preferred stability control agent is a mixture of $C_{12}$–$C_{18}$ fatty acid esters of glycerol.

Blowing Agents

It is contemplated that various blowing agents can be used in the present invention, including physical blowing agents such as hydrocarbons. The preferred physical blowing agents for this invention are organic chemical compounds that have boiling points less than about 37° C. These organic compounds include, but are not limited to, fully hydrogenated hydrocarbons and partially fluorinated hydrocarbons which are considered to be flammable. Flammable as defined herein generally includes those materials having flashpoints less than about 37.8° C.

The preferred fully hydrogenated hydrocarbon blowing agents include the initial members of the alkane series of hydrocarbons that contain up to five carbon atoms and which are not regulated by governmental agencies as being specifically toxic to human or plant life under normal exposure. These fully hydrogenated blowing agents include methane, ethane, propane, n-butane, isobutane, n-pentane, isopentane and blends thereof.

The most preferred fully hydrogenated hydrocarbon blowing agent are the $C_2$ to $C_4$ compounds and the blends thereof. An example of a preferred blend is a blend of approximately 64 weight percent n-butane and approximately 36 weight percent isobutane, which is commonly referred to in the industry as A26 butane blend. This blend can be added at a rate of from about 1 to about 20 weight percent of the total extruder flow rate, and preferably added at a rate of from about 3 to about 15 weight percent of the total extruder flow rate.

It is contemplated that auxiliary blowing agents may be used in the present invention in amounts less than about 40 weight percent of the total blowing agent. The preferred auxiliary blowing agent are partially fluorinated hydrocarbon blowing agents that have molecules containing up to three carbon atoms without any other halogen atoms, and those considered flammable. For example, this includes 1,1-difluoroethane (HFC-152a), and 1,1,1-trifluoroethane (HFC-143a), with the most preferred auxiliary blowing agent being HFC-152a. It is also contemplated that 1-1-chlorofluoroethane (HFC-142b) and 1-1-dichloro-2-fluoroethane (HFC-141b) may be added as auxiliary blowing agents for non-regulated insulation applications.

In addition, water may optionally be added at a low concentration level as an auxiliary blowing agent. The water quality should be at least adequate for human consumption. Water containing a high level of dissolved ions may cause excessive nucleation, so therefore deionized water is preferred. The preferred rate for water addition is from about 0.05 to about 0.5 parts water to 100 parts of the polymeric mixture (0.05 to 0.5 phr). The most preferred rate of adding water is from about 0.2 to about 0.3 phr.

Lastly, it is contemplated that other additives may be added to the foamable composition, including, but not limited to, antistatics, coloring agents, fire retardants, antioxidants and plasticizers.

The Foamed Product

The polymeric foams produced with the inventive composition are generally of a density from about 10 kg/m³ to about 150 kg/m³. The polymeric foams are produced with consistently uniform physical properties. The polymeric foams are light in weight and can be used as protective or cushioning packaging for delicate goods such as computers, glassware, televisions, furniture, and any article that needs to be protected from gouging, surface-scratching or marring. Other contemplated applications for the polymeric foam of the present invention include uses in insulation, toys, floatation foam (e.g., life jackets) and recreational parts.

When producing polymeric foams having a density less than about 150 kg/cm³, a physical blowing agent, such as a hydrocarbon, is typically added at a rate of from about 7 to about 20 parts by weight to 100 parts of polymeric composition.

The polymeric foam of the present invention preferably has a thin cross-section. The term "thin cross-section" as used herein is defined as a dimension in the thickness direction of the foamed structure that is less than about 13 mm. The preferred dimension in the thickness direction of the present invention is from about 0.5 to about 13 mm. It is contemplated, however, that the polymeric foams of the present invention may have thicker cross-sections.

The foam of the present invention is "dimensionally" stable. Dimensional stability as defined herein is when the volume of the foam does not either deviate more than about 15 volume percent (i.e., does not either shrink more than about 15 volume percent or expand more than about 15 volume percent) from the volume of the polymeric foam at the time of production. The volume of the polymeric foam at the time of production is measured within about 15 minutes, and preferably within 10 minutes, after the foam exits the die. This measurement is used in determining the "fresh" density of the foam. To have a dimensionally stable product, the foam is typically measured after aging process (from about 16 to about 30 days) and compared to its fresh volume. It is recognized, however, that in the unlikely event that the foam at a later duration is not within about 15 volume percent of its fresh volume, then it is not a dimensionally stable product. It is preferable that the foam does not deviate more than about 10 volume percent from its "fresh" volume.

The foams of the present invention are resilient and non-brittle. The term "brittleness" is defined in the art as being the inverse of toughness. Toughness is the ability of a material to resist breakage or fracture in the presence of an external force, such as compression, flexure or tension. Resiliency and non-brittleness can be characterized by a tensile toughness value.

Tensile toughness is represented by the area under the stress versus strain curve during tension and is measured in units of energy per specific volume (e.g., $MJ/m^3$ in SI units). The actual tensile toughness value for a given material structure is obtained by rigorous integration of the area under the stress versus strain curve.

In foams made from conventional extrusion processes, tensile toughness values in the machine direction (MD) are generally greater than the tensile toughness values in the cross-machine direction (CMD). The cross-machine direction tensile toughness of the foam as determined under ASTM D412 is generally greater than about 50 $KJ/m^3$. The preferred CMD tensile toughness is greater than about 100 $KJ/m^3$, while the most preferred CMD tensile toughness is greater than about 150 $KJ/m^3$. The CMD tensile toughness, however, may be greater than about 250 $KJ/m^3$.

The MD tensile toughness of the inventive foam as determined under ASTM D412 is generally greater than about 75 $KJ/m^3$. The preferred MD tensile toughness is greater than about 150 $KJ/m^3$, while the most preferred MD tensile toughness is greater than about 225 $KJ/m^3$. The MD tensile toughness, however, may be greater than about 375 $KJ/m^3$.

The CMD tensile strength of the inventive foam as determined under ASTM D412 is generally greater than about 150 kPa. The preferred CMD tensile strength is greater than about 250 kPa, while the most preferred CMD tensile strength is greater than about 350 kPa. The MD tensile strength of the foam as determined under ASTM D412 is generally greater than about 250 kPa. The preferred MD tensile strength is greater than about 350 kPa, while the most preferred MD tensile strength is greater than about 450 kPa.

The CMD tear strength of the inventive foam as determined under ASTM D624 is generally greater than about 0.65 kN/m. The preferred CMD tear strength is greater than about 0.95 kN/m, while the most preferred CMD tear strength is greater than about 1.25 kN/m. The CMD tear strength, however, may be greater than about 2.00 kN/m. The MD tear strength of the foam as determined under ASTM D624 is generally greater than about 0.65 kN/m. The preferred MD tear strength is greater than about 0.95 kN/m, while the most preferred MD tear strength is greater than about 1.25 kN/m. The MD tear strength, however, may be greater than about 2.00 kN/m.

The CMD split tear strength of the inventive foam is determined under ASTM D1938 with a thickness normalization (i.e., dividing the force by the thickness of the foam). The CMD split tear strength is generally greater than about 0.50 kN/m. The preferred CMD split tear strength is greater than about 0.65 kN/m, while the most preferred CMD split tear strength is greater than about 0.95 kN/m. The CMD split tear strength, however, may be greater than about 2.00 kN/m. The MD split tear strength of the foam as determined under ASTM D1938 with a thickness normalization (i.e., dividing the force by the thickness of the foam). The MD split tear strength is generally greater than about 0.50 kN/m. The preferred MD split tear strength is greater than about 0.65 kN/m, while the most preferred MD split tear strength is greater than about 0.95 kN/m. The MD split tear strength, however, may be greater than about 2.00 kN/m.

The CMD tensile elongation of the inventive foam is determined under ASTM D412 is generally greater than about 50%. The preferred CMD tensile elongation is greater than about 80%, while the most preferred CMD tensile elongation is greater than about 110%. The MD tensile elongation of the inventive foam as determined under ASTM D 412 is generally greater than about 50%. The preferred MD tensile elongation is greater than about 80%, while the most preferred MD tensile elongation is greater than about 110%.

The Film/Foam Laminate

According to another embodiment of the present invention, the foam described above may be incorporated into a film/foam laminate. The film layers of the film/foam laminate comprises from about 40 to about 300 parts by weight to 100 parts by weight of the foam layer(s). The film layer(s) includes at least one laminate layer, an optional liner layer and an optional outer shell layer. As discussed above, at least one foam layer of the film/foam laminate is produced from a polymeric composition comprising about 1 to about 90 weight percent of LLDPE, with the remainder (i.e., 10 to about 99 weight percent) being essentially a resiliency modifier resin such as LDPE.

Figure 1:
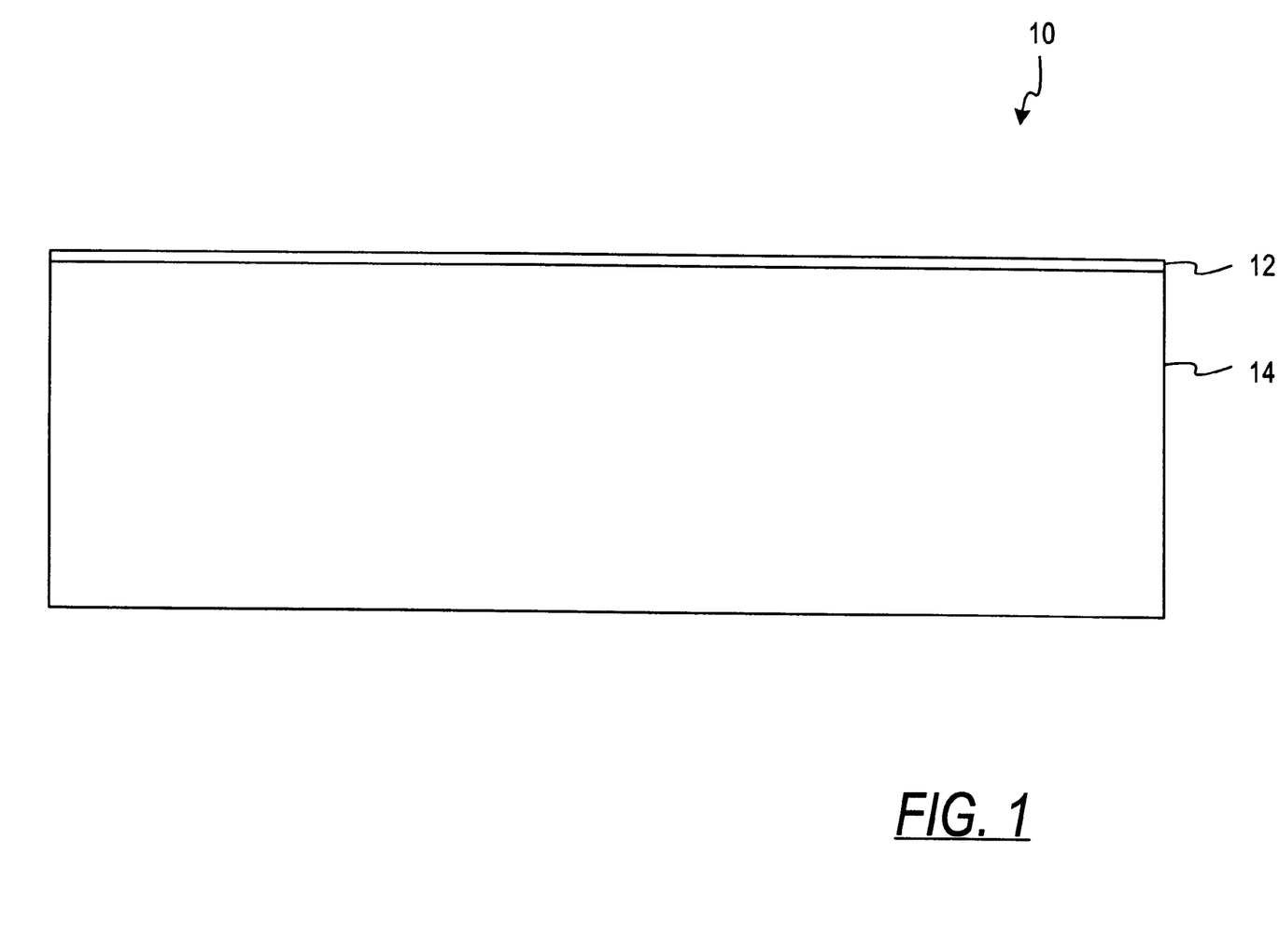
FIG. 1 is a cross-sectional view illustrating an embodiment of a two-layer film/foam laminate according to the present invention.
Figure 2:
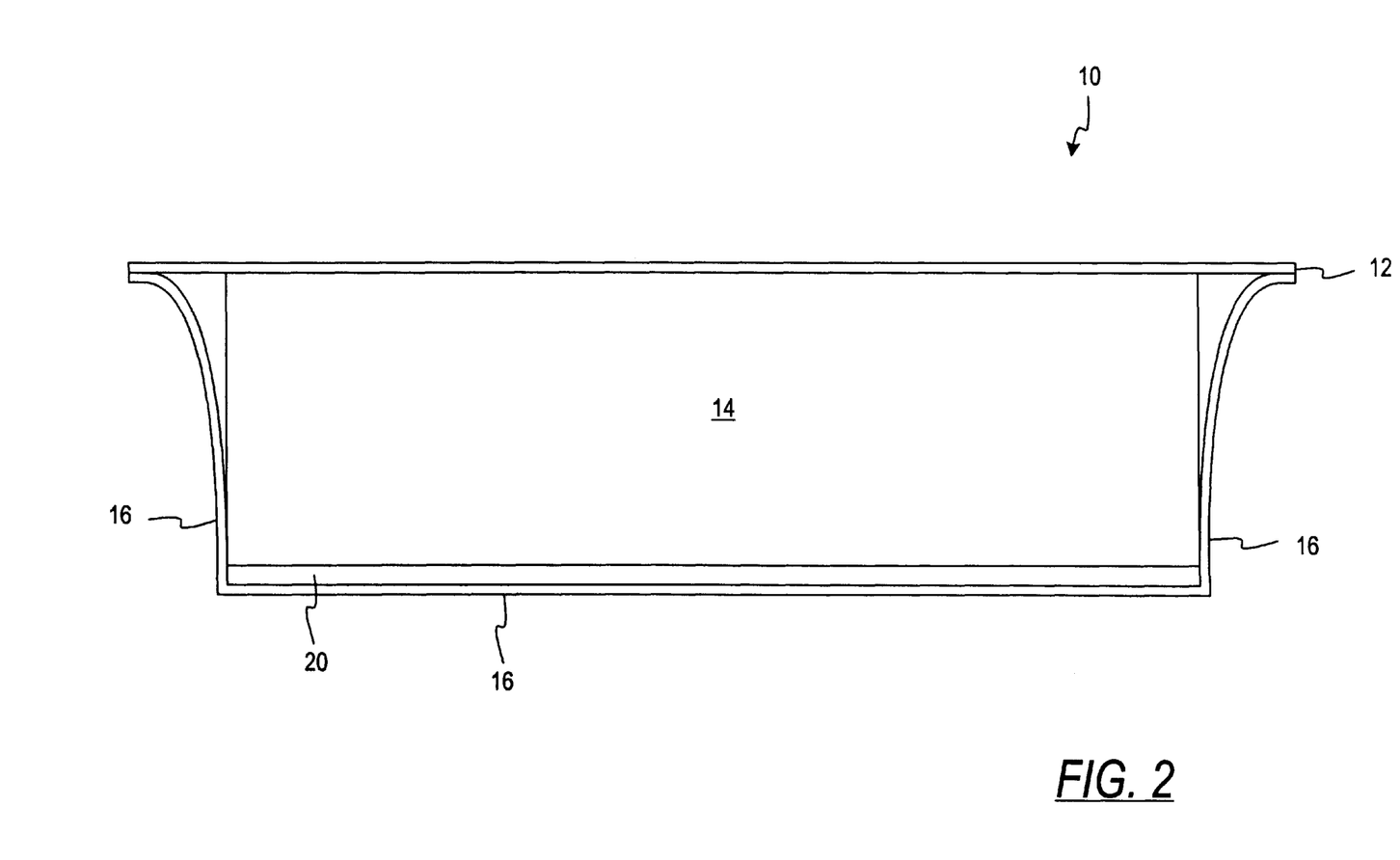
FIG. 2 is a cross-sectional view illustrating one embodiment of a three-layer film/foam laminate according to the present invention.
Figure 3:
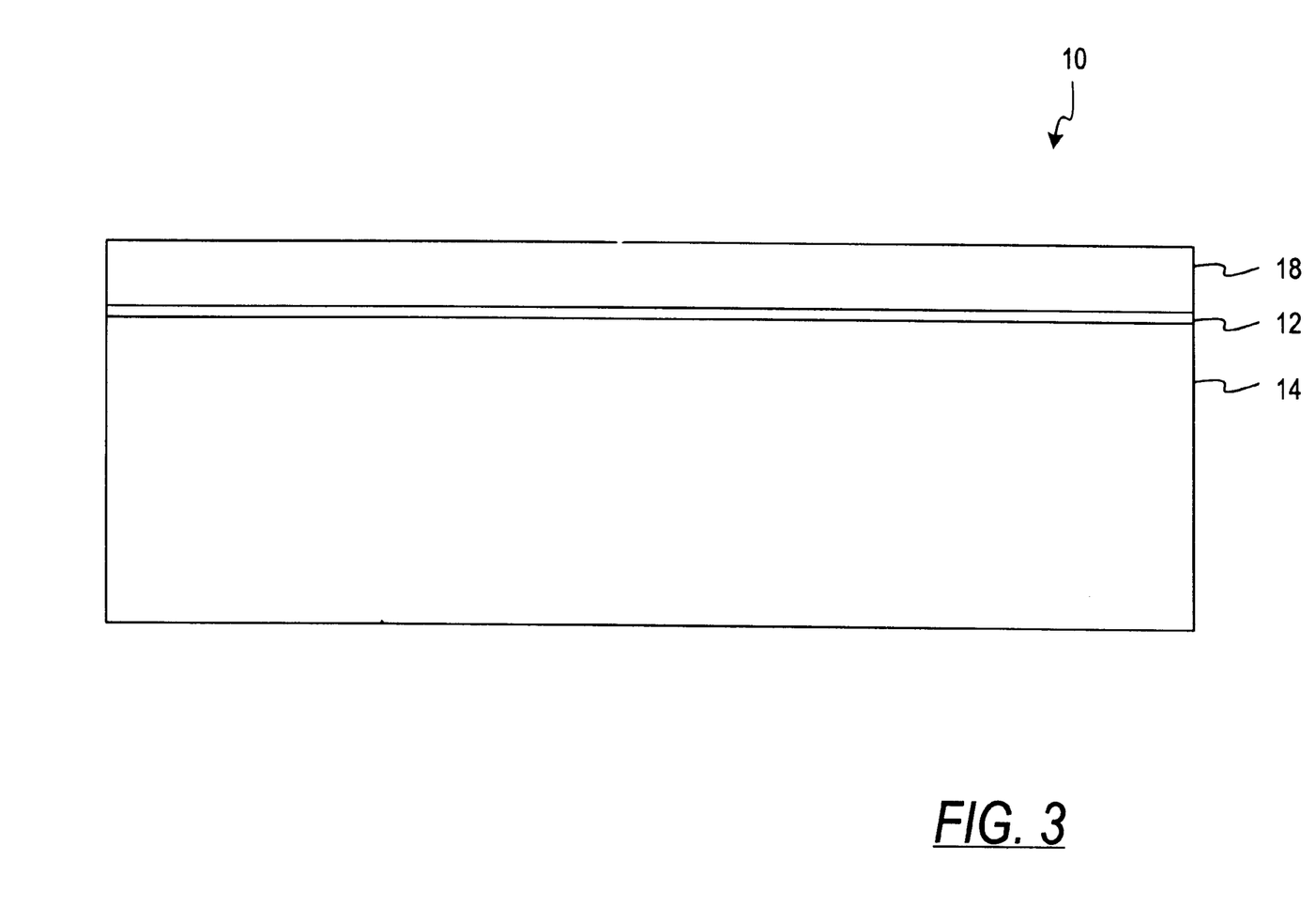
FIG. 3 is a cross-sectional view illustrating one embodiment of another three-layer film/foam laminate according to the present invention.
Figure 4:
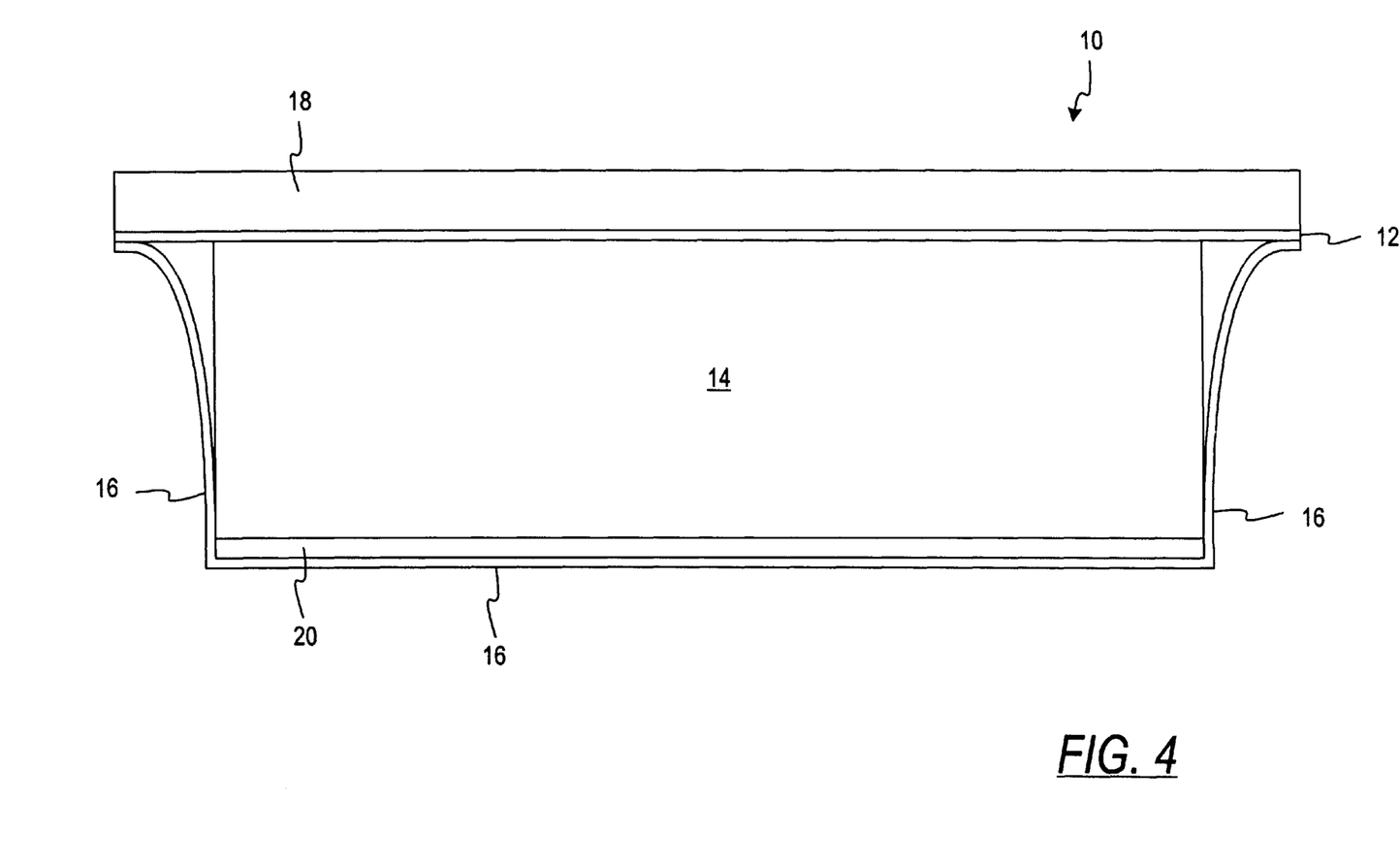
FIG. 4 is a cross-section view illustrating an embodiment of a four-layer film/foam laminate according to the present invention.
Figure 5:
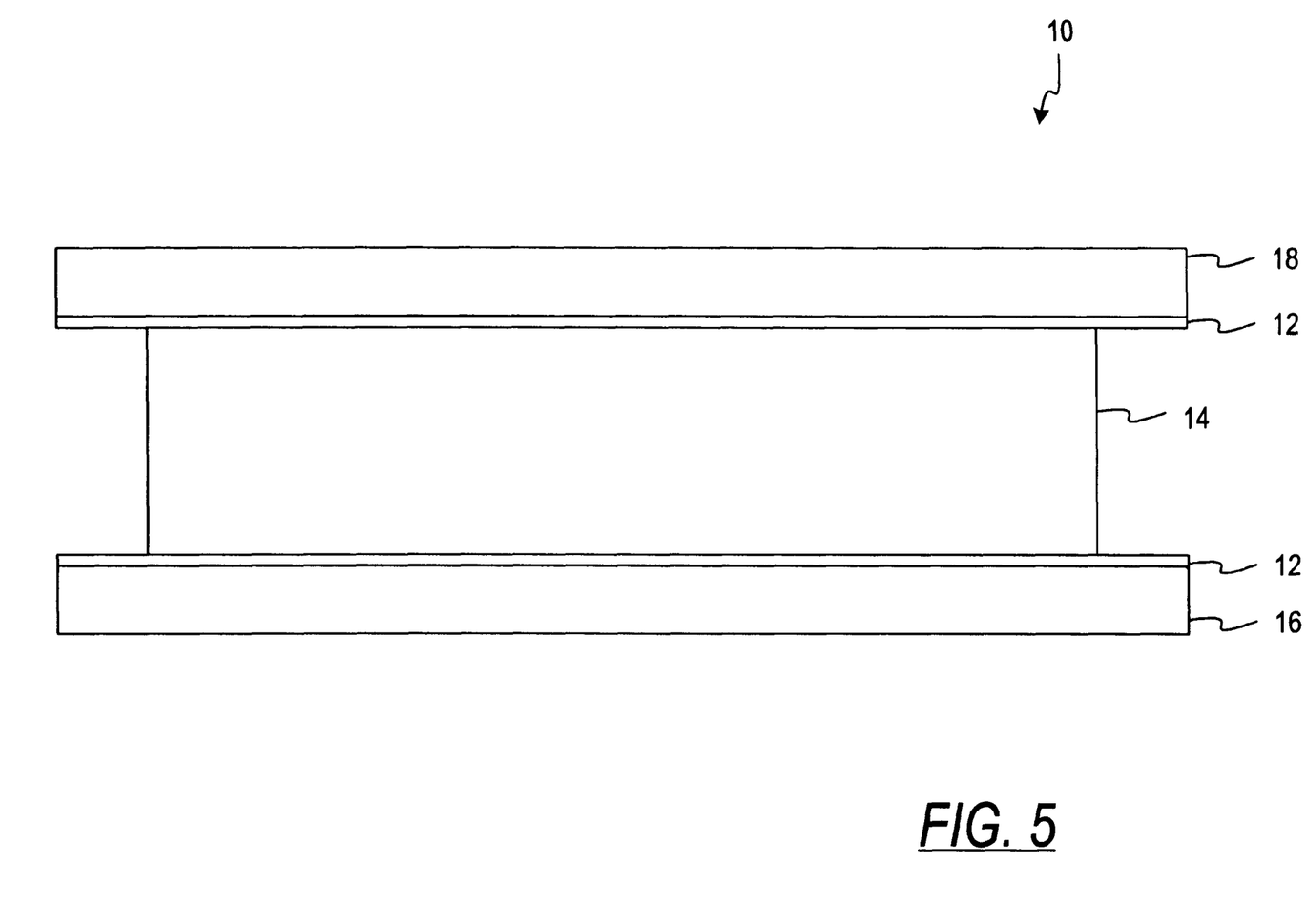
FIG. 5 is a cross-sectional view illustrating an embodiment of a five-layer film/foam laminate according to the present invention.

The film layer or layers of the present invention may include up to at least 4 or more additional layers. For example, FIG. 1 depicts a two layer film/foam laminate, FIGS. 2–3 depict three layer film/foam laminates, FIG. 4 depicts a four layer film/foam laminate and FIG. 5 depicts a five layer film/foam laminate. It is contemplated that other film/foam laminates may be formed, such a film/foam laminate having two outer layers of foam with an inner laminate layer.

In FIG. 1, a film/foam laminate 10 of the present invention is depicted with a laminate layer 12 being bonded to a foam layer 14 to form a two layer structure. In FIG. 2, the laminate layer 12 is also bonded to the foam layer 14. A liner layer 16 of FIG. 2 is an outer layer that is not directly bonded to the opposite side of foam layer 14, but is held in place by being bonded to a portion of the laminate layer 12 on each edge.

An air gap or space 20 exists between the foam layer 14 and the liner layer 16. The liner layer 16 contacts the laminate layer 12 because the liner layer 16 and the laminate layer 12 have greater widths than the foam layer 14. For example, the widths of the liner layer 16 and the laminate layer 12 are generally about 2 to about 6 cm wider than the width of the foam layer 14.

In FIG. 3, an outer shell layer 18 is an external surface layer that is bonded to the laminate layer 12. The laminate layer 12 is located between the outer shell layer 18 and is bonded to one surface of foam layer 14 so as to form a three layer structure.

In FIG. 4, an outer shell layer 18 is an external surface layer that is bonded to a laminate layer 12. The laminate layer 12 is located between the outer shell layer 18 and is bonded to one surface of a foam layer 14. A liner layer 16 is another external surface layer that is not directly bonded to the opposite side of the foam layer 14, but is held in place by being bonded to a portion of the laminate layer 12 on each edge. An air gap or space 20 exists between the foam layer 14 and the liner layer 16. The liner layer 16 contacts the laminate layer 12 because the liner layer 16 and the laminate layer 12 have greater widths than the foam layer 14. As discussed above, the widths of the liner layer 16 and the laminate layer 12 are generally from about 2 to about 6 cm wider than the width of the foam layer 14.

In FIG. 5, a outer shell layer 18 is an external surface layer that is bonded to a laminate layer 12. The laminate layer 12 is located between the outer shell layer 18 and is bonded to one surface of a foam layer 14. A second laminate layer 12 is bonded to the other surface of foam layer 14 and is located between the foam layer 14 and a liner layer 16. The liner layer 16 is an external surface layer that is bonded to the second laminate layer 12. The widths of the laminate layer 12, liner layer 16 and the outer shell layer 18 are generally about 2 to about 6 cm greater than the width of the foam layer 14.

The Laminate Layer

The polymeric composition to be used in producing the laminate layer 12 of the present invention generally comprises from about 40 to about 80 weight percent of LLDPE and from about 20 to about 60 weight percent of LDPE. It is contemplated that other resiliency modifiers resin may replace the LDPE resin. Reclaimed material may also be included in the polymeric composition for producing the laminate layer 12 at levels up to about 75 weight percent. As discussed above, the reclaimed material generally comprises from about 30 to about 80 weight percent of the same LLDPE as defined above. Thus, the polymeric composition to be used in producing the laminate layer 12 comprises LLDPE attributable to the reclaimed material in the amount up to about 60 weight percent of the polymeric composition. Additional virgin LLDPE resin may be added to the polymeric composition to be used in producing the laminate layer 12 in an amount up to about 80 weight percent of the polymeric composition.

The preferred polymeric composition to be used in producing the laminate layer 12 comprises virgin LLDPE from about 10 to about 35 weight percent, virgin LDPE from about 7 to about 25 weight percent and reclaimed material from about 50 to about 75 weight percent. The preferred ratio of LLDPE to LDPE is from about 1.2:1 to about 1.8:1. The most preferred polymeric composition for producing the laminate layer 12 comprises virgin LLDPE from about 13 to about 23 weight percent, virgin LDPE from about 8 to about 16 weight percent and reclaimed material from about 65 to about 75 weight percent. The most preferred ratio of LLDPE to LDPE is from about 1.4:1 to about 1.6:1.

The laminate layer 12 generally has a mean film thickness of from about 20 to about 60 μm and is preferably from about 25 to about 50 μm. The preferred thickness variation from the mean laminate layer thickness is less than about ±10%. For example, a mean film thickness of 30 μm preferably have thicknesses of from about 27 μm. to about 33 μm.

The laminate layer 12 has a ratio of the melt index (MI) of the LDPE to the MI of the LLDPE of from about 1 to about 6, a preferred ratio of from about 2 to about 4 and a most preferred ratio of 2.5 to about 3.5.

The Liner Layer

The polymeric composition to be used in producing the optional liner layer 16 of the present invention generally comprises from about 40 to about 80 weight percent LLDPE and from about 20 to about 60 weight percent LDPE. It is contemplated that other resiliency modifier resins may replace the LDPE resin. The polymeric composition for producing the liner layer 16 preferably comprises LLDPE from about 50 to about 70 weight percent and LDPE from about 30 to about 50 weight percent, and most preferably comprises LLDPE from about 55 to about 65 weight percent and LDPE from about 35 to about 45 weight percent. The liner layer 16 also includes a slip agent which is generally from about 0.2 to 0.8 about phr (parts per 100 parts of polymer). The liner layer 16 also includes an anti-blocking agent which is generally from about 0.2 to about 0.8 phr. Conventional slip agents and anti-blocking agent may be used in the liner layer 16.

The liner layer 16 of the film/foam laminate has a mean film thickness of from about 15 to about 40 μm. The preferred thickness of the liner layer 16 is from about 20 to about 30 μm and the most preferred thickness is from about 21 to about 25 μm. The variation of thicknesses from the mean liner layer thickness is preferably less than about ±10%. For example, a mean liner layer thickness of 20 μm has a variation of thickness preferably from about 18 μm to about 22 μm.

The polymeric composition to be used in producing the liner layer 16 has a ratio of the melt index (MI) of the LDPE resin to the MI of the LLDPE resin of from about 1 to about 6, a preferred ratio of from about 2 to about 4 and a most preferred ratio of 2.5 to about 3.5. The tensile strength of the liner layer 16 in both the machine direction (MD) and cross machine direction (CMD) is generally from about 13.0 MPa to about 35.5 MPa as measured by ASTM D412. The preferred MD and CMD tensile strengths of the liner layer 16 are from about 14.0 MPa to about 31.0 MPa.

The puncture resistance of the liner layer 16 as measured by the F-50 Dart Drop test procedure (ASTM D1709) is at least about 90 grams, preferably at least about 120 grams, and most preferably at least about 150 grams. The MD and CMD tensile elongations of the liner layer 16 as measured by the ASTM D412 are generally at least about 300%. The MD and CMD tensile elongations of the liner layer 16 are preferably greater than about 350% and most preferably greater than about 400%.

The MD and CMD tear strengths of the liner layer 16 are greater than about 56 kN/m as measured by ASTM D624. The MD and CMD tear strengths of the liner layer 16 are preferably greater than about 68 kN/m and most preferably greater than about 79 kN/m.

The Outer Shell Layer

The polymeric composition to be used in producing the optional outer shell layer (also referred to as the film phase) 18 generally comprises linear low density polyethylene (LLDPE) from about 50 to 100 weight percent and low density polyethylene (LDPE) from about 0 to about 50 weight percent. It is contemplated that other resiliency modifier resins may replace the LDPE resin. The preferred polymeric composition for producing the outer shell layer 18 comprises LLDPE from about 65 to about 90 weight percent and LDPE from about 10 to about 35 weight percent. The most preferred polymeric composition to be used in producing the outer shell layer 18 comprises LLDPE from about 75 to about 85 weight percent and LDPE from about 15 to about 25 weight percent.

The outer shell layer 18 of the film/foam laminate of the present invention can be formed in a variety of mean film thicknesses to meet specific physical property goals. For example, a film/foam laminate which is used for less abrasive or less puncture-prone applications may have an outer shell layer 18 having a smaller mean film thickness than those used in heavier-duty abrasive applications. The outer shell layer 18 generally has a mean film thickness of from about 15 to about 200 µm. The preferred thickness of the outer shell layer 18 is from about 20 to about 160 µm. The thicknesses variation from the mean film thickness of the outer shell layer 18 is preferably less than about ±10%. For example, if the preferred mean film thickness of the outer shell layer 18 is 100 µm, then the thickness of the outer shell layer 18 is preferably from about 90 µm to about 110 µm. The most preferred thickness variation from the mean film thickness of the outer shell layer 18 is less than about ±5%.

The polymeric composition for producing the outer shell layer 18 has a ratio of a melt index (MI) of the LDPE resin to the MI of the LLDPE resin of from about 1 to about 6, a preferred ratio of from about 2 to about 4 and a most preferred ratio of from about 2.5 to about 3.5.

The MD and CMD tensile strengths of the outer shell layer 18 as measured by ASTM D412 are generally from about 13.0 MPa to about 35.5 MPa. The preferred MD and CMD tensile strengths of the outer shell layer 18 are from about 14.0 MPa to about 31.0 MPa.

The puncture resistance of the outer shell layer 18 as measured by the F-50 Dart Drop test procedure (ASTM D1709) is at least about 315 grams, preferably at least about 400 grams, and most preferably at least about 500 grams. The MD and CMD tensile elongations of the outer shell layer 18 as measured by the ASTM D412 are greater than about 300%. The MD and CMD tensile elongations of the outer shell layer 18 are preferably greater than about 350% and most preferably greater than about 400%.

The MD and CMD tear strengths of the outer shell layer 18 are greater than about 56 kN/m as measured by ASTM D624. The MD and CMD tear strengths of the outer shell layer 18 are preferably greater than about 68 kN/m and most preferably greater than about 79 kN/m.

The film/foam laminates of the present invention may include additional ingredients such as coloring agents, antistatics, fire retardants, antioxidants and plasticizers.

The film/foam laminates may be used in the same applications as discussed above with respect to the polymeric foam of the present invention. The film/foam laminates are generally used in conjunction with heavier duty goods such as furniture.

Processes of the Present Invention

According to one embodiment of the present invention, the process for making foam begins by loading pellets of a LLDPE and a resiliency modifier resin such as LDPE into an extrusion hopper. The polymeric composition comprises from about 1 to about 90 weight percent LDPE and from about 10 to about 99 weight percent LDPE. The polymeric composition can comprise all virgin resins of LLDPE and LDPE. Alternatively, the process of the present invention may include the addition of reclaimed material. The polymeric composition may comprise up to about 40 weight percent and even up to 60 weight percent reclaimed material.

The polymeric composition, along with about 0.5 to about 2.0 weight percent loading of pellets of talc compounded in polyethylene the nucleating agent, are fed by gravity into a extruder. The polymeric composition may comprise from 0 to about 1.0 weight percent coloring agent which may be fed by gravity into an extruder. The polymeric-talc-coloring agent composition is conveyed through a feed zone of the extruder and heated at a temperature sufficient to form a polymeric-talc-coloring agent melt.

A physical blowing agent is added at an injection port area of the extruder in an appropriate ratio to the target density. A stability control agent, such as $C_{12}$–$C_{18}$ fatty acid esters of glycerol, is also added at the injection port area of the extruder. The polymeric-talc-coloring agent melt, the selected blowing agent and the stability control agent are thoroughly mixed within the extruder in the mixing zone, and subsequently cooled in a cooling zone. The cooled polymeric-blowing agent melt is extruded through a die (a die appropriate to the desired product form) into a lower pressure region, then formed by forced air so that the resulting bubble diameter to the diameter of the annular die opening is in the ratio from about 1.8 to about 4.5. The extruded tube is drawn over a cooling mandrel for forced cooling of the inner surface. The extruded tube is then slit by, for example, a conventional slitting machine to form a foam sheet. The foam sheet may optionally pass through a heating oven in which heated forced air is blown directly over its surfaces to reduce the residual blowing agent.

The foam of the present invention is preferably formed from a tandem extrusion system, although it may be formed on an extended single screw extrusion system (i.e., one with a L:D greater than 40:1).

According to another embodiment of the present invention, a film/foam laminate is produced. The foam layer may be produced in a manner as described above in the process of producing foam. The optional outer shell layer and optional liner layer may be prepared as blown films. It is contemplated, however, that the outer shell layer and the liner layer can be prepared as cast films.

The process for preparing the outer shell layer begins by loading pellets of LLDPE and LDPE into an extrusion hopper. The polymeric composition to be used in producing the outer shell layer comprises from about 50 to 100 weight percent of LLDPE and from 0 to about 50 weight percent of LDPE. The pellets of LLDPE and LDPE are fed by gravity into the extruder. The polymeric composition is conveyed though the feed zone of the extruder and heated at a temperature sufficient to form a polymeric melt. The polymeric melt is further mixed within the extruder in a mixing zone and then extruded through an annular die. The extrudate is expanded by forced air so that the ratio of the resulting bubble diameter to the diameter of the annular die opening is from about 2.0 to about 3.6. The resulting outer shell layer film is wound on a roll and stored for subsequent use.

The process for preparing the liner layer begins by loading pellets of LLDPE and LDPE into an extrusion hopper. The polymeric composition to be used in producing the liner layer comprises from about 40 to about 80 weight percent LLDPE and from about 20 to about 60 weight percent LDPE. A slip agent and an anti-blocking agent are both added in amounts of from about 0.2 to about 0.8 phr into the extrusion hopper. The polymeric composition is fed by gravity into an extruder. The polymeric composition is conveyed though the feed zone of the extruder and heated at a temperature sufficient to form a polymeric melt. The polymeric melt is further mixed within the extruder in a mixing zone and then extruded through an annular die. The extrudate is expanded by forced air so that the ratio of the resulting bubble diameter to the diameter of the annular die opening is from about 2.0 to about 3.6. The resulting liner layer film is wound on a roll and stored for subsequent use.

The process for preparing the laminate layer begins by loading pellets of LLDPE, LDPE and optionally film/foam laminate scrap into an extrusion hopper. The polymeric composition to be used in producing the laminate layer comprises from about 40 to about 80 weight percent LLDPE and from about 20 to about 60 weight percent LDPE. Reclaimed material may be added to the polymeric composition of the laminate layer in amounts up to 40 weight percent and even up to about 60 weight percent of the polymeric composition. The polymeric composition is fed by gravity into the extruder. The polymeric composition is conveyed though the feed zone of an extruder and heated at a temperature sufficient to form a polymeric melt. The polymeric melt is further mixed within the extruder in a mixing zone and then extruded through a sheeting die. In one embodiment, the laminate layer is attached to the foam immediately after the foam layer is formed. The foamed layer can then be fed directly into the laminating unit.

The rolls of the optional outer shell layer film and the optional liner layer film are staged so that the films can be continuously fed as required into a nipping roller arrangement that produces the desired film/foam laminate as shown, for example, in the FIGS. 1–5.

In the embodiment depicted in FIG. 1, the film/foam laminate includes a foam layer and a laminate layer. The foam layer is continuously fed directly through a nipping roller simultaneously with the laminate layer. The width of the laminate layer is adjusted to be approximately equal to or slightly less than the width of the foam layer. The film/foam laminate is subsequently cooled and then optionally folded in the machine direction so that the two halves of the foam-surfaced side are adjacent. The film/foam laminate is then spooled to form a roll.

In the embodiment depicted in FIG. 2, a three layer film/foam laminate includes a foam layer, laminate layer and a liner layer. The foam layer and liner layer are continuously fed directly through a nipping roller simultaneously with the laminate layer so that the laminate layer is on one side of the foam layer and the liner layer is on the opposite side. The width of the laminate layer is from about 2 cm to about 6 cm greater than the width of the foam layer. The three layer embodiment is subsequently cooled and optionally folded in the machine direction so that the two halves of the side with the liner layer are adjacent. The three layer embodiment is then spooled to form a roll.

In the embodiment depicted in FIG. 3, another three-layer film/foam laminate includes a foam layer, a laminate layer and an outer shell layer. The foam layer and liner layer are continuously fed directly through a nipping roller simultaneously with the outer shell layer so that the outer shell layer is on one side of the laminate layer and the foam layer is on the opposite side. The width of the laminate layer is about equal to or slightly less than the width of the foam layer. The three layer embodiment is subsequently cooled and optionally folded in the machine direction so that the two halves of the foam-surfaced side are adjacent. The three layer embodiment is then spooled to form a roll.

In the embodiment depicted in FIG. 4, the film/foam laminate includes a foam layer, laminate layer, an outer shell layer and a liner layer. The outer shell layer, the foam layer and liner layer are continuously fed directly through a nipping roller simultaneously with the laminate layer so that the laminate layer is on one side of the foam sheet and the liner layer is on the opposite side. The width of the laminate layer is from about 2 cm to about 6 cm greater than the width of the foam layer. The four layer embodiment is subsequently cooled and optionally folded in the machine direction so that the two halves of the side with the liner layer are adjacent. The four layer embodiment is then spooled to form a roll.

The embodiment depicted in FIG. 5 is similarly formed as that described in the above with respect to FIG. 4, but includes adding a second laminate layer.

EXAMPLES

Preparation of Inventive Example 1

Pellets of Equistar Petrothene® NA957-000 low density polyethylene (LDPE) (specific gravity of 0.924 g/cm$^3$; and a melt index (MI) of 2.6 dg/min.), Westlake LDPE EF 636 (specific gravity of 0.919 g/cm$^3$; and a MI of 2.4 dg/min.) and Nova Chemicals Novapol polyethylene LF-0219-A (specific gravity of 0.919 g/cm$^3$; and a MI of 2.3 dg/min.) in an indeterminable proportion. Pellets of reclaimed film/foam laminate which generally contained from about 30 to about 80 weight percent Union Carbide DFDA-2207 linear low density polyethylene (LLDPE) (specific gravity of 0.922 g/cm$^3$; MI of 0.7 dg/min.; $M_z$ of 950,000; and D of 16) with the balance being Equistar Petrothene® NA957-000, Westlake LDPE EF 636 and Nova Chemicals Novapol polyethylene LF-0219-A in a second indeterminable proportion. The weight ratio of the dry blend of Equistar Petrothene® NA957-000, Westlake LDPE EF 636 and Nova Chemicals Novapol polyethylene LF-0219-A (a LDPE) to the reclaimed laminate was 90:10. These pellets were mixed with 1.54 parts per hundred parts polymer of Plastics Color Chip A130612 50%-loaded talc concentrate based in LDPE and with 0.82 parts per hundred parts polymer of Hudson Color Concentrate HC30067LD 50:1 brown concentrate, and heated in a 48:1 L:D NRM 6 inch (152.4 mm) single screw extruder operating at about 41 to about 45 μm to form a polymeric blend. Pressurized commercial-grade, A26 butane blend (22.1 MPa) was injected at a rate of 44.5 kg/hr. Molten (102° C.) and pressurized (22.1 MPa) American Ingredients Company Pationic® 1052 fatty acid esters of glycerol was injected at a rate of 0.7 kg/hr (0.25 weight percent of the polymeric mixture).

The polymer blend, A26 butane blend and glycerol ester were mixed and cooled to a melt temperature of about 116° C. at 3.8 MPa. The head pressure of the extruder was regulated by a Normag 2200 gear pump control system. A melt pump increased the pressure of the extrudate to about 12.8 MPa for delivery at 285 kg/hr into a die. The foam sheet was passed through a heating oven for about a 50 minute period at 58° C.

Preparation of Inventive Example 2

The conditions of Example 1 were repeated, except the ratio of the dry blend to reclaimed material was changed from 90:10 to 80:20.

Preparation of Inventive Example 3

The conditions of Example 1 were repeated, except the ratio of the dry blend to reclaimed material was changed from 90:10 to 70:30.

Preparation of Inventive Example 4

The conditions of Example 1 were repeated, except the ratio of the dry blend to reclaimed material was changed from 90:10 to 60:40.

Preparation of Inventive Example 5

The conditions of Example 1 were repeated, except the ratio of the dry blend to reclaimed material was changed from 90:10 to 50:50.

Preparation of Inventive Example 6

Pellets of Union Carbide DFDA-2207 linear low density polyethylene (LLDPE) (specific gravity of 0.922 g/cm$^3$; a MI of 0.7 dg/min.; $M_z$ of 950,000; and D=16), pellets of Westlake LDPE 606 (specific gravity of 0.918 g/cm$^3$; and a MI of 2.0 dg/min.), and pellets of a compounded blend of 9 parts by weight of Westlake LDPE 606 to 1 part by weight of American Ingredients Company Pationic® 1052 fatty acid esters of glycerol were prepared in a weight ratio of 10:80:10. These pellets were mixed with 0.28 parts per hundred parts polymer of Techmer 1901-T talc concentrate based in LDPE, and then heated in a 48:1 L:D Wilmington 3 inch (76 mm) single-screw extruder operating at about 30 to 31 rpm to form a polymeric melt. Pressurized commercial grade, A25 butane blend (22.1 MPa) was injected at a rate of 5.9 kg/hr.

The polymer melt and A25 butane blend were cooled to a melt temperature of about 118° C. at 3.8 MPa. The head pressure of the extruder was regulated by a Normag 2200 gear pump control system. A Normag 183 melt pump increased the pressure of the extrudate to about 12.4 MPa for delivery at 37 kg/hr into a die.

Preparation of Inventive Example 7

The conditions of Example 6 were repeated, except the ratio of LLDPE/LDPE/glycerol ester compound was changed from 10:80:10 to 20:70:10.

Preparation of Inventive Example 8

The conditions of Example 6 were repeated, except the ratio of LLDPE/LDPE/glycerol ester compound was changed from 10:80:10 to 30:60:10.

Preparation of Inventive Example 9

The conditions of Example 6 were repeated, except the ratio of LLDPE/LDPE/glycerol ester compound was changed from 10:80:10 to 40:50:10.

Preparation of Inventive Example 10

The conditions of Example 6 were repeated, except the ratio of LLDPE/LDPE/glycerol ester compound was changed from 10:80:10 to 50:40:10.

Preparation of Inventive Example 11

The conditions of Example 6 were repeated, except the ratio of LLDPE/LDPE/glycerol ester compound was changed from 10:80:10 to 60:30:10.

Preparation of Inventive Example 12

The conditions of Example 6 were repeated, except the ratio of LLDPE/LDPE/glycerol ester compound was changed from 10:80:10 to 70:20:10.

Preparation of Inventive Example 13

Pellets of Union Carbide DFDA-2207 linear low density polyethylene (LLDPE), pellets of Westlake LDPE 606, and pellets of a compounded blend of 9 parts by weight of Westlake LDPE 606 to 1 part by weight of American Ingredients Company Pationic® 1052 fatty acid esters of glycerol were prepared in a weight ratio of 80:10:10. These pellets were mixed with 0.28 parts per hundred parts polymer of Techmer 1901-T talc concentrate based in LDPE, and heated in a 32:1 L:D Berlyn 2.5 inch (35 mm) single screw extruder operating at about 35 rpm to form a polymeric melt. Pressurized commercial grade, A25 butane blend (22.1 MPa) was injected at a rate of 5.9 kg/hr. The polymer melt and A25 butane blend were mixed and further heated to a melt temperature of about 171° C. and pressurized to 13.8 MPa at the extruder discharge. The extruder speed was regulated to provide a control extrusion head pressure by the control system.

The heated mixture was then transferred through a heated pipe to a second, larger 3.5 inch (89 mm) single screw cooling extruder. Thus, Example 13 was run on a tandem extrusion system. Subsequently, the extrudate was cooled to a melt temperature of about 108° C. at 7.0 MPa. The head pressure of the extruder was regulated by a Normag 220 gear pump control system. A Normag 183 melt pump increased the pressure of the extrudate to about 7.43 MPa for delivery at 37 kg/hr into a die.

Preparation of Inventive Example 14

The conditions of Example 13 were repeated, except the pellets of LDPE were eliminated so that the ratio of LLDPE/glycerol ester compound was 90:10.

Preparation of Inventive Example 15

The conditions of Example 13 were repeated, except the LDPE resin was changed to Equistar NA966-000 (specific gravity of 0.922 g/cm$^3$; and a MI of 0.75 dg/min.) and the LLDPE/LDPE/glycerol ester compound blend ratio was changed from 80:10:10 to 45:45:10.

Preparation of Comparative Example 16

The conditions of Example 1 were repeated, except the reclaimed film/foam laminate was eliminated.

Preparation of Comparative Example 17

A LDPE resin and an LDPE/glycerol ester compound were used to produce a foam on the same extrusion system as described above in the Preparation of Inventive Example 13. Pellets of Westlake LDPE 606 resin and pellets of the glycerol ester compound were mixed with 0.28 parts per hundred parts polymer of Techmer 1901-T talc concentrate based in LDPE and heated in a 32:1 L:D Berlyn 2.5 inch (35 mm) single screw extruder operating at about 35 rpm to form a polymeric melt. Pressurized commercial grate, A25 butane blend (22.1 MPa) was injected at a rate of 5.9 kg/hr. The polymeric melt and A25 butane blend were mixed and further heated to a melt temperature of about 171° C. and pressurized to 13.8 MPa at the extruder discharge. The extruder speed was regulated to provide a controlled head pressure by a control system.

The heated mixture was then transferred through a heated pipe to a second, larger 3.5 inch (89 mm) single screw cooling extruder. Subsequently, the extrudate was cooled to a melt temperature of about 99° C. at 7.0 MPa. The head pressure of the extruder was regulated by a Normag 2200 gear pump control system. A Normag 183 melt pump increased the pressure of the extrudate to about 7.43 MPa for delivery at 37 kg/hr into a die.

Preparation of Comparative Example 18

The conditions of Example 1 were repeated, except the composition of the reclaimed material was changed to comprise from about 30 to about 80 weight percent of Union Carbide ST-1129 LLDPE (specific gravity of 0.922 g/cm$^3$; a MI of 0.5 dg/min.; $M_z$ of 550,000; and D=6) and the ratio of the LDPE/reclaimed material was changed from 90:10 to 99:1. No samples were obtained because no foam was formed.

Preparation of Comparative Example 19

The conditions of Example 6 were repeated, except the LLDPE resin was changed to Union Carbide ST-1129 LLDPE. No samples were obtained even though a foam was formed because the foam was not dimensionally stable (i.e., it shrank about 50 volume percent).

Preparation of Comparative Example 20

The conditions of Example 6 were repeated, except the LLDPE resin was changed to Equistar GB-502024 linear low density (specific gravity of 0.922 g/cm$^3$; and a MI of 2.0 dg/min.). $M_z$ is believed to be less than 600,000. No samples were obtained because no foam was made.

Preparation of Comparative Example 21

The conditions of Example 14 were repeated, except the LLDPE resin was changed to Equistar GB-501010 linear low density (specific gravity of 0.922 g/cm$^3$; and a MI of 0.75 dg/min.). $M_z$ is believed to be less than 600,000. No samples were obtained because no foam was made.

Testing Results

The semi-molten extrudate of each the Examples (except Comparative Examples 17–18 and 20–21 where no samples were obtained) was drawn over a mandrel. The properties of the samples of the resulting foams sheets are shown in Table 1.

The properties of the foam sheet of Inventive Foams 1–5 and Comparative Foam 16 were measured within about 10 minutes after the foam sheet exited a heating oven. For Inventive Foams 1–5 and Comparative Foam 16, 6 cross-web samples were evaluated to obtain an average fresh density and an average fresh foam thickness. For example, as shown in Table 1, Inventive Foam 1 had a fresh density of 24.5 kg/m$^3$ and an average foam thickness of 2.2 mm. Each foam was visually inspected for about three hours after the foam was made.

Inventive Foams 6–15 and Comparative Foam 17 were measured within about minutes after the semi-molten extrudate had exited the die. For Inventive Foams 6–15 and Comparative Foam 17, 2 samples were evaluated to obtain an average fresh density and an average fresh foam thickness. Each foam was visually inspected for about three hours after the foam was made.

As shown in Table 1, the foam in each Example was evaluated after certain time intervals (see testing age). For instance, Inventive Foam 1 was evaluated after 6 days and had an average aged density of 29.3 kg/m$^3$ and an average aged foam thickness of 1.8 mm. The average MD and CMD tear strengths were 2.10 and 3.29 kN/m, respectively. Also, the average MD and CMD split tear strengths, tensile strengths, tensile elongations and tensile toughnesses were also tested and are shown in Table 1.

Although not shown in the Table 1, the dimensional stability of each of the foams was calculated from the fresh and aged densities. For example, Inventive Foam 1 had a dimensional stability of 16.4% ([29.3–24.5]/29.3). Inventive Foams 9 and 10 were the most dimensionally stable foams having dimensional stabilities of 1.6% and 1.4%, respectively, while Inventive Foams 5 and 6 were the least dimensionally stable foams having dimensional stabilities of about 24.4% and 24.2%, respectively. The remaining inventive comparative foams had dimensional stabilities from about 3% to about 18.5%.

TABLE 1

INVENTIVE FOAMS

| Example No. | Foam Polymeric Composition | Fresh Density (kg/m³) | Fresh Thickness (mm) | Testing Age (days) | Aged Density (kg/m³) | Aged Thickness (mm) | Cell Count (cell/cm) | MD Tear Strength (kN/m) | CMD Tear Strength (kN/m) | MD Split Tear Strength (kN/m) | CMD Split Tear Strength (kPa) | MD Tensile Strength (kPa) | CMD Tensile Strength (kPa) | MD Tensile Elongation (%) | CMD Tensile Elongation (%) | MD Tensile Toughness (kJ/M³) | CMD Tensile Toughness (kJ/m³) |
|---|---|---|---|---|---|---|---|---|---|---|---|---|---|---|---|---|---|
| 1 | 10.0% Reclaimed Film/Foam Laminate 90.0% Three-Resin LDPE Dry Blend | 24.5 | 2.2 | 6 | 29.3 | 1.8 | 13.4 | 2.10 | 3.29 | 1.18 | 1.28 | 771 | 256 | 65.6 | 59.6 | 341 | 97 |
| 2 | 20.0% Reclaimed Film/Foam Laminate 80.0% Three-Resin LDPE Dry Blend | 23.7 | 2.3 | 6 | 27.7 | 1.9 | 14.2 | 1.40 | 2.78 | 0.66 | 1.22 | 716 | 230 | 65.3 | 47.3 | 313 | 64 |
| 3 | 30.0% Reclaimed Film/Foam Laminate 70.0% Three-Resin LDPE Dry Blend | 21.6 | 2.6 | 6 | 25.6 | 2.4 | 13.4 | 1.42 | 2.24 | 0.59 | 1.12 | 561 | 181 | 76.6 | 49.8 | 283 | 55 |
| 4 | 40.0% Reclaimed Film/Foam Laminate 60.0% Three-Resin LDPE Dry Blend | 18.7 | 3.0 | 6 | 20.3 | 2.8 | 12.6 | 1.25 | 2.03 | 0.74 | 1.18 | 472 | 181 | 71.5 | 47.2 | 230 | 58 |
| 5 | 50.0% Reclaimed Film/Foam Laminate 50.0% Three-Resin LDPE Dry Blend | 16.7 | 3.0 | 6 | 22.1 | 2.6 | 12.6 | 1.48 | 1.98 | 0.71 | 1.10 | 523 | 188 | 76.4 | 55.7 | 274 | 71 |
| 6 | 10.0% Union Carbide DFDA-2207 LLDPE 80.0% Westlake 606 LDPE | 27.2 | 2.4 | 12 | 21.9 | 2.6 | 12.6 | 1.70 | 2.55 | 0.92 | 1.23 | 476 | 267 | 106.4 | 79.2 | 370 | 139 |
| 7 | 10.0% 9:1 LDPE/Pationic 1052 Compound 20.0% Union Carbide DFDA-2207 LLDPE 70.0% Westlake 606 LDPE | 28.8 | 2.5 | 11 | 29.8 | 2.2 | 12.6 | 2.52 | 3.30 | 1.50 | 2.13 | 445 | 336 | 137.4 | 115 | 473 | 269 |
| 8 | 10.0% 9:1 LDPE/Pationic 1052 Compound 30.0% Union Carbide DFDA-2207 LLDPE 60.0% Westlake 606 LDPE | 23.7 | 2.3 | 11 | 25.0 | 2.2 | 13.4 | 2.35 | 3.75 | 1.16 | 2.31 | 545 | 305 | 152 | 116.7 | 623 | 238 |
| 9 | 10.0% 9:1 LDPE/Pationic 1052 Compound 40.0% Union Carbide DFDA-2207 LLDPE 50.0% Westlake 606 LDPE | 30.8 | 1.5 | 9 | 30.3 | 1.4 | 8.7 | 2.77 | 3.56 | 2.24 | 1.93 | 454 | 315 | 132.3 | 189.8 | 469 | 426 |
| 10 | 10.0% 9:1 LDPE/Pationic 1052 Compound 50.0% Union Carbide DFDA-2207 LLDPE 40.0% Westlake 606 LDPE | 22.1 | 3.3 | 9 | 21.8 | 3.1 | 11.0 | 2.05 | 2.52 | 1.77 | 1.65 | 259 | 220 | 150.7 | 166.1 | 316 | 270 |
| 11 | 10.0% 9:1 LDPE/Pationic 1052 Compound 60.0% Union Carbide DFDA-2207 LLDPE 30.0% Westlake 606 LDPE | 23.1 | 3.0 | 8 | 25.5 | 2.5 | 9.4 | 2.98 | 3.31 | 2.17 | 2.54 | 449 | 296 | 137.1 | 118.1 | 498 | 236 |
| 12 | 10.0% 9:1 LDPE/Pationic 1052 Compound 70.0% Union Carbide DFDA-2207 LLDPE 20.0% Westlake 606 LDPE | 20.2 | 2.9 | 8 | 24.5 | 2.6 | 7.9 | 2.99 | 3.20 | 1.93 | 2.70 | 368 | 254 | 131.1 | 145.1 | 394 | 265 |
| 13 | 10.0% 9:1 LDPE/Pationic 1052 Compound 80.0% Union Carbide DFDA-2207 LLDPE 10.0% Equistar NA-966-000 | 37.2 | 1.4 | 14 | 36.4 | 1.3 | 9.4 | 3.91 | 3.94 | 2.45 | 2.50 | 506 | 387 | 77 | 139.5 | 325 | 381 |
| 14 | 10.0% 9:1 LDPE/Pationic 1052 Compound 90.0% Union Carbide DFDA-2207 LLDPE | 42.4 | 1.4 | 14 | 38.9 | 1.8 | 9.4 | 4.26 | 2.57 | 2.50 | 1.98 | 345 | 314 | 52.9 | 198 | 148 | 452 |
| 15 | 10.0% 9:1 LDPE/Pationic 1052 Compound 45.0% Union Carbide DFDA-2207 LLDPE 45.0% Equistar NA-966-000 | 25.9 | 3.3 | 14 | 24.2 | 3.2 | 7.9 | 2.71 | 3.73 | 1.17 | 2.10 | 486 | 294 | 152 | 87.5 | 534 | 180 |

TABLE 1-continued

| Example No. | Foam Polymeric Composition | Fresh Density (kg/m³) | Fresh Thickness (mm) | Testing Age (days) | Aged Density (kg/m³) | Aged Thickness (mm) | Cell Count (cell/cm) | MD Tear Strength (kN/m) | CMD Tear Strength (kN/m) | MD Split Tear Strength (kN/m) | CMD Split Tear Strength (kPa) | MD Tensile Strength (kPa) | CMD Tensile Strength (kPa) | MD Tensile Elongation (%) | CMD Tensile Elongation (%) | MD Tensile Toughness (kJ/M³) | CMD Tensile Toughness (kJ/m³) |
|---|---|---|---|---|---|---|---|---|---|---|---|---|---|---|---|---|---|
| | | | | | COMPARATIVE FOAMS | | | | | | | | | | | | |
| 16 | 100% Three-Resin LDPE Dry Blend | 21.9 | 2.5 | 6 | 26.9 | 2.1 | 12.6 | 1.60 | 2.77 | 0.78 | 1.32 | 585 | 223 | 72 | 51.8 | 285 | 73 |
| 17 | 100% Westlake 606 LDPE | 20.5 | 2.5 | 14 | 19.7 | 2.4 | 9.4 | 1.00 | 1.70 | 0.60 | 0.68 | 466 | 168 | 72.3 | 64.3 | 212 | 68 |

The Inventive foams made with the reclaimed film/foam laminate (Inventive Foams 1–5) had MD and CMD tensile toughness values that were slightly lower than Comparative Foams 16 and 17. Surprisingly, the Inventive foams made with a virgin LLDPE resin (Inventive Foams 6–15) showed much higher MD and CMD tensile toughness values than Comparative Foams 16 and 17. Specifically, the values of MD and CMD tensile toughness of Inventive Foams 6–15 were generally about 150 to about 400% higher than the values of Comparative Foams 16 and 17.

Inventive Foams 1–15 generally had higher values in CMD tensile strength than the values of Comparative Foams 16 and 17. The values of MD tensile strength of Inventive Foams 1–15 were generally lower than the values of Comparative Foams 16 and 17.

Inventive Foams 1–5 had MD and CMD tensile elongations that were similar to the values of Comparative Foams 16 and 17 with the CMD tensile elongation values being slightly lower than Comparative Foam 17. Surprisingly, Inventive Foams 6–15 had MD and CMD tensile elongations that were much higher than Comparative Foams 16 and 17. Specifically, the MD and CMD tensile elongations were generally about 150 to about 200% higher than the values of Comparative Foams 16 and 17.

Inventive Foams 1–5 had MD and CMD tear strengths and split tear strengths that were similar to Comparative Foams 16 and 17. Specifically, Inventive Foams 1–5 generally had higher values than Comparative Foam 17 in MD and CMD tear strengths and split tear strengths, while generally having lower values than Comparative Foam 16. Surprisingly, Inventive Foams 6–15 had MD and CMD tear strengths and split tear strengths that exceeded Comparative Foams 16 and 17. Inventive Foams 6–15 generally had values that were from about 150 to about 200% higher than the values of Comparative Foams 16 and 17.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A process for preparing a polymeric foam, said process comprising the steps of:
   (a) melting a linear low density polyethylene and a resiliency modifier resin to form a polymeric composition, said polymeric composition comprising from about 1 to about 90 weight percent linear low density polyethylene and from about 10 to about 99 weight percent resiliency modifier resin, said linear low density polyethylene having a z-average molecular weight, $M_z$, greater than about 700,000 and a polydispersity index, $D=M_w/M_n$, of from about 10 to about 20;
   (b) adding a stability control agent to said polymeric composition;
   (c) dissolving an effective amount of blowing agent;
   (d) transferring the mixture of step (c) to an expansion zone; and
   (e) permitting the mixture of step (d) to expand in said expansion zone to produce said polymeric foam.

2. The process of claim 1 further including the step of adding a nucleating agent to said polymeric composition before step (c).

3. The process of claim 2 wherein said nucleating agent is selected from the group consisting of talc, crystalline silica and a mixture of citric acid and sodium bicarbonate.

4. The process of claim 1 wherein said blowing agent is chosen from the group consisting of methane, ethane, propane, n-butane, isobutane, n-pentane and blends thereof.

5. The process of claim 4 wherein said blowing agent is chosen from the group of n-butane, isobutane and a blend thereof.

6. A polymeric foam formed by the process of claim 1.

7. The process of claim 1 wherein the amount of said linear low density polyethylene is from about 10 to about 60 weight percent.

8. The process of claim 7 wherein the amount of said linear low density polyethylene is from about 20 to about 45 weight percent.

9. The process of claim 1 wherein the amount of said resiliency modifier resin is from about 40 to about 90 weight percent.

10. The process of claim 9 wherein the amount of said resiliency modifier resin is from about 55 to about 80 weight percent.

11. The process of claim 1 wherein said linear low density polyethylene has a z-average molecular weight greater than about 800,000.

12. The process of claim 11 wherein said linear low density polyethylene has a z-average molecular weight greater than about 900,000.

13. The process of claim 1 wherein the polydispersity index, D, of said linear low density polyethylene is from about 12 to about 20.

14. The process of claim 13 wherein said polydispersity index is from about 14 to about 18.

15. The process of claim 1 wherein said resiliency modifier resin is selected from the group consisting of low density polyethylenes, medium density polyethylenes, ethylene vinyl acetate, ethylene ethyl acrylate, ethylene methyl acrylate, ethylene n-butyl, ethylene acrylic acid, ethylene methacrylic, ethylene vinyl alcohol, ionomer and combinations thereof.

16. The process of claim 15 wherein said resiliency modifier resin is a low density polyethylene or medium density polyethylene.

17. The process of claim 16 wherein said resiliency modifier resin is a low density polyethylene.

18. The process of claim 15 wherein said resiliency modifier resin is a blend of at least two low density polyethylenes.

19. The process of claim 1 further including the step of adding at least one additive.

20. The process of claim 19 wherein said at least one additive is selected from the group consisting of antistatics, coloring agents, fire retardants, antioxidants and plasticizers.

21. The process of claim 1 wherein said stability control agent is a mixture of $C_{12}$–$C_{18}$ fatty acid esters of glycerol.

22. A polymeric foam prepared by the process comprising:
   (a) melting a linear low density polyethylene and a resiliency modifier resin to form a polymeric composition, said polymeric composition comprising from about 1 to about 90 weight percent of said linear low density polyethylene and from about 10 to about 99 weight percent resiliency modifier resin, said linear low density polyethylene having a z-average molecular weight, $M_z$, greater than about 700,000 and a polydispersity index, $D=M_w/M_n$, of from about 10 to about 20;
   (b) adding a stability control agent to said polymeric composition;
   (c) dissolving an effective amount of blowing agent;
   (d) transferring the mixture of step (c) to an expansion zone;

(e) permitting the mixture of step (d) to expand in said expansion zone to produce said polymeric foam; and wherein said polymeric foam has a cross-machine direction tensile toughness greater than about 50 KJ/m$^3$.

23. The polymeric foam of claim 22 wherein said cross-machine direction tensile toughness is greater than about 100 KJ/m$^3$.

24. The polymeric foam of claim 23 wherein said cross-machine direction tensile toughness is greater than about 150 KJ/m$^3$.

25. The polymeric foam of claim 22 wherein the density of said polymeric foam is from about 10 kg/m$^3$ to about 150 kg/m$^3$.

26. The polymeric foam of claim 22 wherein the cross-section of said polymeric foam is less than about 13 mm.

27. The polymeric foam of claim 22 wherein said polymeric foam is dimensionally stable.

28. The polymeric foam of claim 22 wherein the amount of said linear low density polyethylene is from about 10 to about 60 weight percent.

29. The polymeric foam of claim 28 wherein the amount of said linear low density polyethylene is from about 20 to about 45 weight percent.

30. The polymeric foam of claim 22 wherein the amount of said resiliency modifier resin is from about 40 to about 90 weight percent.

31. The polymeric foam of claim 30 wherein the amount of said resiliency modifier resin is from about 55 to about 80 weight percent.

32. The polymeric foam of claim 22 wherein said linear low density polyethylene has a z-average molecular weight, $M_z$, greater than about 800,000.

33. The polymeric foam of claim 32 wherein said linear low density polyethylene has a z-average molecular weight, $M_z$, greater than about 900,000.

34. The polymeric foam of claim 33 wherein said linear low density polyethylene has a z-average molecular weight, $M_z$, of about 950,000.

35. The polymeric foam of claim 22 wherein the machine direction tensile toughness of said polymeric foam is greater than about 75 KJ/m$^3$.

36. The polymeric foam of claim 35 wherein the machine direction tensile toughness is greater than about 150 KJ/m$^3$.

37. The polymeric foam of claim 36 wherein the machine direction tensile toughness is greater than about 225 KJ/m$^3$.

38. The polymeric foam of claim 22 wherein the cross-machine tear strength of said polymeric foam is greater than about 0.65 kN/m.

39. The polymeric foam of claim 38 wherein the cross-machine tear strength is greater than about 0.95 kN/m.

40. The polymeric foam of claim 22 wherein said foam is capable of being used in a film/foam laminate.

41. The polymeric foam of claim 22 wherein the cross-machine direction tensile strength of said polymeric foam is greater than about 150 kPa.

42. The polymeric foam of claim 41 wherein the cross-machine direction tensile strength of said polymeric foam is greater than about 350 kPa.

43. The polymeric foam of claim 22 wherein the machine direction tensile strength of said polymeric foam is greater than about 250 kPa.

44. The polymeric foam of claim 43 wherein the machine direction tensile strength of said polymeric foam is greater than about 450 kPa.

45. The polymeric foam of claim 22 wherein the machine direction tear strength of said polymeric foam is greater than about 0.95 kN/m.

46. The polymeric foam of claim 45 wherein the machine direction tear strength of said polymeric foam is greater than about 2.00 kN/m.

47. The polymeric foam of claim 22 wherein the polydispersity index is from about 14 to about 18.

48. The polymeric foam of claim 22 wherein the cross-section of said polymeric foam is from about 0.5 mm to about 13 mm.

49. A film/foam structure comprising:
at least one foam layer and at least one film layer;
wherein one of said foam layer(s) is produced from a polymeric composition comprising from about 1 to about 90 weight percent of a linear low density polyethylene and from about 10 to about 99 weight percent of a resiliency modifier resin, said linear low density polyethylene having a z-average molecular weight, $M_z$, greater than about 700,000 and wherein said foam layer has a density of from about 10 kg/m$^3$ to about 150 kg/m$^3$ and a thickness of from about 0.5 mm to about 13 mm; and
wherein said one of said film layer(s) is a laminate layer, said laminate layer being bonded to said foam layer.

50. The film/foam structure of claim 49 wherein said laminate layer is produced from a polymeric composition comprising from about 40 to about 80 weight percent linear low density polyethylene and from about 20 to about 60 weight percent low density polyethylene.

51. The film/foam structure of claim 50 wherein said laminate layer is made from up to about 75 weight percent of reclaimed material, said reclaimed material comprising linear low density polyethylene and low density polyethylene.

52. The film/foam structure of claim 49 wherein the film/foam structure comprises a foam layer and two film layers: an outer shell layer and said laminate layer, said outer shell layer is produced from a polymeric composition comprising from about 50 to 100 weight percent linear low density polyethylene and from 0 to about 50 weight percent low density polyethylene; wherein said outer shell layer is bonded to said laminate layer.

53. The film/foam structure of claim 49 wherein the film/foam structure comprises a foam layer and two film layers: a liner layer and said laminate layer, said liner layer is produced from a polymeric composition comprising from about 40 to about 80 weight percent linear low density polyethylene and from about 20 to about 60 weight percent low density polyethylene; wherein said liner layer is bonded to said laminate layer.

54. The film/foam structure of claim 49 wherein the film/foam structure comprises a foam layer and three film layers: a liner layer, an outer shell layer and said laminate layer, said liner layer and said laminate layer are produced from polymeric compositions comprising from about 40 to about 80 weight percent linear low density polyethylene and from about 20 to about 60 weight percent low density polyethylene, said outer shell layer is produced from a polymeric composition comprising from about 50 to 100 weight percent linear low density polyethylene and from 0 to about 50 weight percent low density polyethylene;
wherein said outer shell layer is bonded to said laminate layer, said foam layer being located between said laminate layer and said linear layer, said liner layer being bonded to a portion of said laminate layer.

55. The film/foam structure of claim 49 wherein the film/foam structure comprises a foam layer and four film layers: a liner layer, an outer shell layer, first and second laminate layers, said liner layer and said first and second laminate layers are produced from polymeric compositions comprising from about 40 to about 80 weight percent linear low density polyethylene and from about 20 to about 60 weight percent low density polyethylene, said outer shell layer is produced from a polymeric composition comprising from about 50 to 100 weight percent linear low density polyethylene and from 0 to about 50 weight percent low density polyethylene;

wherein said outer shell layer is bonded to said first laminate layer, said first laminate layer being bonded to said foam layer, said foam layer being bonded to said second laminate layer and said second laminate layer being bonded to said liner layer.

56. The film/foam structure of claim 49 wherein the polydispersity index is from about 10 to about 20.

57. The film/foam structure of claim 56 wherein the polydispersity index is from about 14 to about 18.

\* \* \* \* \*